United States Patent
Freking et al.

(10) Patent No.: US 7,010,561 B2
(45) Date of Patent: Mar. 7, 2006

(54) SYSTOLIC RING-PLANARIZED CYLINDRICAL ARRAY MODULAR MULTIPLER

(75) Inventors: William Lee Freking, Lexington, MA (US); Keshab K. P. Parhi, Mission Viejo, CA (US)

(73) Assignee: William L. Freking, Lexington, MA (US)

( * ) Notice: Subject to any disclaimer, the term of this patent is extended or adjusted under 35 U.S.C. 154(b) by 657 days.

(21) Appl. No.: 10/267,605

(22) Filed: Oct. 9, 2002

(65) Prior Publication Data

US 2004/0073587 A1   Apr. 15, 2004

(51) Int. Cl.
*G06F 7/38*   (2006.01)

(52) U.S. Cl. ..................................... 708/491
(58) Field of Classification Search .................. 708/491
See application file for complete search history.

(56) References Cited

U.S. PATENT DOCUMENTS

| | | | | |
|---|---|---|---|---|
| 5,101,431 A * | 3/1992 | Even | ............................ | 380/30 |
| 5,313,530 A * | 5/1994 | Iwamura | ....................... | 380/28 |
| 6,061,706 A * | 5/2000 | Gai et al. | .................... | 708/491 |
| 6,625,631 B1 * | 9/2003 | Ruehle | ........................ | 708/491 |
| 6,732,133 B1 * | 5/2004 | Ruehle | ........................ | 708/491 |
| 6,892,215 B1 * | 5/2005 | Freking et al. | ............. | 708/491 |
| 6,907,440 B1 * | 6/2005 | Freking et al. | ............. | 708/491 |

* cited by examiner

*Primary Examiner*—Tan V. Mai

(57) ABSTRACT

A fast, scalable, systolic modular multiplier based on projection onto planar ring structures is presented. Systolic paradigms of limited fan-out on all signal paths and nearest neighbor interconnections guarantee optimally fast clock rates. Linear throughput scalability with respect to consumed hardware resources is achieved through simultaneous parallel processing of multiple independent data streams. Signal sharing among input and output busses and a common control interface for all independent data streams is made possible, thus benefiting integrated circuit implementations.

1 Claim, 1 Drawing Sheet

SYSTOLIC RING-PLANARIZED CYLINDRICAL ARRAY MODULAR MULTIPLER

CROSS-REFERENCE TO RELATED APPLICATIONS

Not applicable.

BACKGROUND OF THE INVENTION

1. Field of the Invention

The present invention relates to the processing of digital signals to render modular multiplication.

2. Description of Related Art

Modular multiplication, which is the computation of A·B modulo M where A, B, and M are integer values, is a fundamental mathematical operation in applications based on number-theoretic arithmetic. A central application area is cryptography, where techniques such as the popular RSA and DSS methods utilize modular multiplication as the elemental computation. Since large word lengths on the order of thousands of bits are typically processed, hardware approaches to modular multiplication are typically very slow. Existing art attempts to address this deficiency through a handful of approaches.

Linear systolic array approaches dominate the art, with the article C. Walter, "Systolic modular multiplication," IEEE Transactions on Computers, v. 42, no. 3, pp. 376–378, 1993, being representative. In such an approach, a linear array of processing elements is connected so that all signal paths are formed between adjoining elements only. Thus, signal path lengths are minimized. Accordingly, all signal paths only connect two adjoining elements, guaranteeing unit fan out. The forgoing properties of systolic arrays ensure that the clock rate is determined solely by the processing element delay. However, efforts to scale the performance beyond the level offered by a single linear array have encountered very limited success. Cell optimization is the commonly applied technique to gain performance. However, performance scales only logarithmically with respect to consumed integrated circuit area.

Another method which attempts to provide a performance-area tradeoff is the digit-serial array. In the paper, J. Guo and C. Wang, "A novel digit-serial systolic array for modular multiplication," in Proc. of the 1998 IEEE International Symposium on Circuits and Systems, v. 2, pp. 177–180, 1998, a digit-serial modular multiplier methodology was presented. However, the arrays were not pipelined, and thus the clock period of the digit-serial cells grows proportionally with digit size. Therefore, performance scaling occurs in a sub-linear fashion for small digit sizes and quickly saturates to yield negligible performance gains for large digit sizes. A non-systolic array was presented in the article H. Orup, "Simplifying quotient digit determination in high-radix modular multiplication," in Proc. of the 12th Symposium on Computer Arithmetic, pp. 193–199, 1995. A roughly linear performance-area tradeoff was achieved through retiming of the modular correction loop within the modular multiplication algorithm. However, the clock rate is severely limited by the required full-word-length signal broadcasts of the modular correction selection bit. Thus, the fan out of the aforementioned signal is the complete word length. Implementational efforts to increase the signal drive through transistor sizing destroys the linear performance-area trade off and only provide minor mitigation of the slow-clock-rate obstacle plaguing this methodology.

SUMMARY OF THE INVENTION

The present invention describes a method for parallel modular multiplication capable of processing multiple independent data streams simultaneously.

An implementation realizing this method consists of a multi-column array of processing elements having a row count equivalent to the number of iterations necessary to process a modular multiplication of a target word length. Each processing element accepts and generates bit-level data and performs partial product formation, modular correction formation, and summation of these generated bits with the right-single-bit-shifted result of the previous algorithmic iteration. The number of columns of the array is determined in accordance with the available integrated circuit implementation area and the desired throughput performance, which scales linearly with column count.

The data stream capacity and operational throughput are directly scalable with the available integrated circuit implementation area. This performance scalability is accomplished while maintaining a systolic paradigm, such that all interconnection paths are locally connected to neighboring processing elements and entail minimal fan out. Thus, the achievable clock rate is maximized and is dictated by the processing element delay rather than by long interconnect paths or loading due to multiple-gate fan out. Moreover, in contrast to isolated parallel modular multiplication arrays, the unified array structure of the present invention incorporates single input and output data buses, thereby reducing global integrated circuit wiring overhead. Additionally, the unified array permits a single controller to be utilized when the modular multiplier is utilized as a component in a higher-level functional unit such as a modular exponentiator.

OBJECTS AND ADVANTAGES OF THE INVENTION

The primary object of this invention is fast parallel processing of modular multiplication.

It is an advantage of this invention that multiple independent data streams may be simultaneously processed. The number of data streams is arbitrary, limited only by implementation area.

It is a primary advantage of this method that throughput performance scales linearly with the area of the integrated circuit implementation while maintaining the optimal systolic clock rate. The latter is attained through guaranteeing properties of purely nearest neighbor interconnections between processing elements and unit signal fan out.

It is an advantage of this invention that input and output data share signal lines such that the number of internal signal buses in an integrated circuit implementation are reduced.

It is an advantage of this invention that a unified control unit may be utilized when the modular multiplier unit is used in a modular exponentiator.

It is an advantage of this invention that regularity of the architecture is two-dimensional rather than uni-dimensional.

DETAILED DESCRIPTION OF PREFERRED EMBODIMENTS

Figure 1:
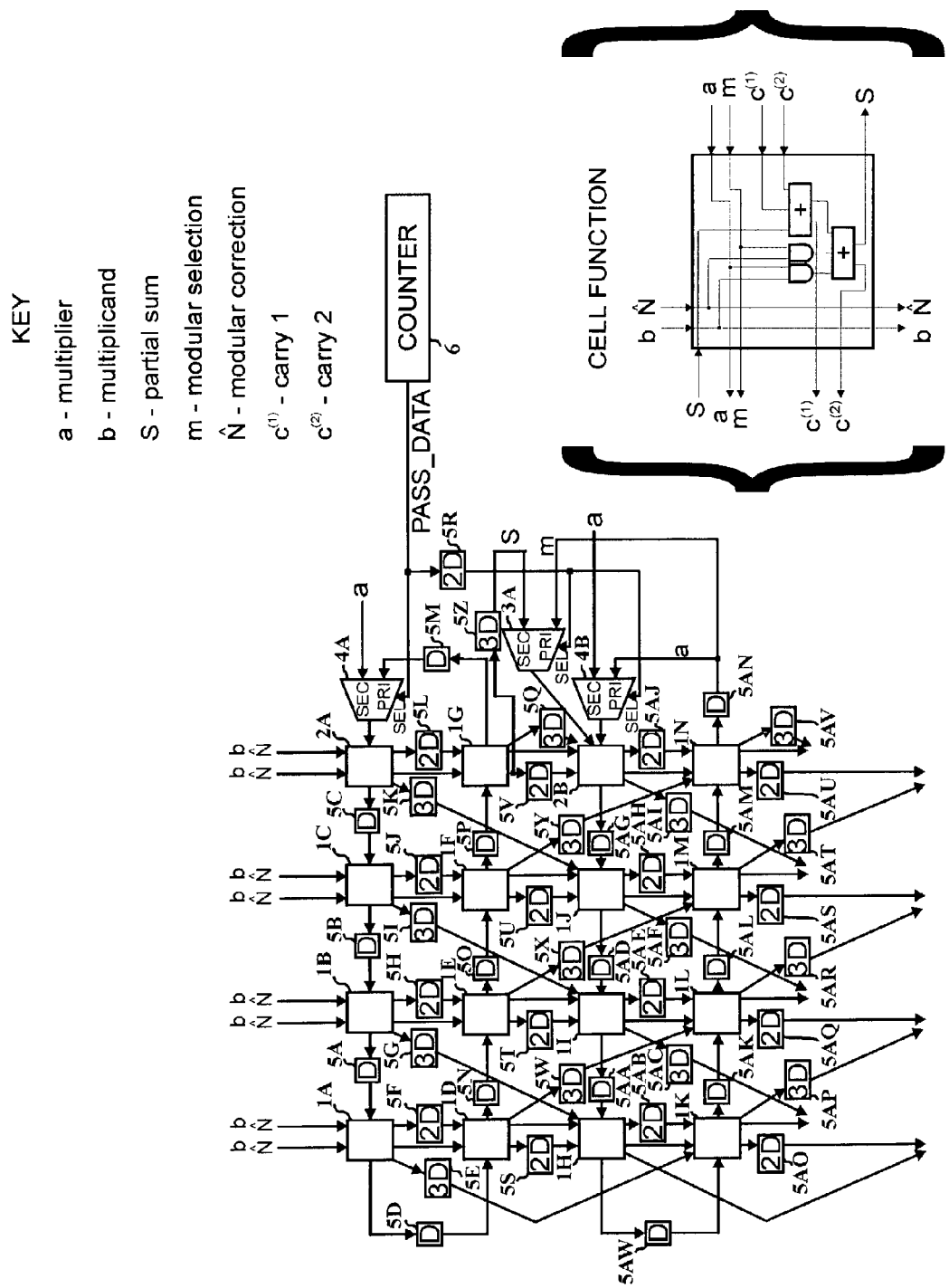
FIG. 1 illustrates the modular multiplier with its connections

The preferred embodiment is an array consisting of N rows of K bit-wise processing elements arranged in a planar ring structure, where N represents the number of iterations in the modular multiplication algorithm and K is an integer parameter with value greater than one. The value of K directly relates to the amount of parallelism implemented in the array and should be chosen in accordance with the amount of integrated circuit area available for the implementation.

Each cell, 1, possesses a set of bit-wise inputs corresponding to the multiplicand, multiplier, modular correction, modular selection, partial sum, and two previous carry signals. Each cell also possesses a set of bit-wise outputs corresponding to the multiplicand, multiplier, modular correction, modular selection, generated partial sum, and two generated carry signals. Let each ring be numbered in ascending order from top to bottom and let each cell within a particular ring be numbered with an index such that the upper-rightmost cell is designated zero and the index is incremented by one for each cell traversed in the counter-clockwise direction. Each cell of ring I and position J is interconnected within the structure in the following manner: the multiplicand and modular correction outputs are each delayed by three clock cycles and are input to cell J+1 mod K of the ring of row I+1. The multiplier, modular selection, and two carry outputs are each delayed by one clock cycle and are input to cell J+1 mod K of the ring of row I. Finally, the generated partial sum output is delayed by two clock cycles and is input to cell J of the ring of row I+1.

The modular correction, multiplier, and carry inputs of each cell of index 0, 2, are modified from the above description in that these inputs are each multiplexed by two levels. The modular correction multiplexer, 3, for an index 0 cell in ring I accepts the modular correction output of the cell K in ring I at the PRI multiplexer input. The SEC input of the same multiplexer is connected to the partial sum output of cell K−1 of ring I−1. The multiplier signal multiplexer, 4, for an index 0 cell in ring I accepts the multiplier output signal from cell K−1 of I−1 at input PRI. The SEC input of the same multiplexer is connected externally for the provision of an initialization value.

Each of the aforementioned multiplexers takes in two data inputs, labeled PRI and SEC. An additional input SEL is used to multiplex data at the PRI and SEC inputs to the multiplexer output. De-assertion of the SEL input selects the PRI input, while assertion selects the SEC input.

Delay elements, 5, have a single input and a single output. Data presented at the input is delayed by a specified number of clock cycles and is then delivered to the output.

A counter, 6, asserts the signal PASS_DATA for one clock cycle every N+2K clock cycles. The signal PASS_DATA is connected to the SEL input of each of the multiplexers associated with cells of index 0 within each ring wherein I mod K=0. De-assertion of the PASS_DATA signal selects the PRI input to the multiplexer, whereas assertion selects the SEC input. The PASS_DATA signal is delayed by two clock cycles and is passed to the SEL input of the associated multiplexers of the cell of index 0 in the next ring wherein I mod K=1. Once again, this signal is delayed by two clock cycles and passed to the multiplexers associated with cell index 0 of the subsequent ring. This procedure is repeated for rings having indexes numbered up to and including I mod K=K−1. Thus, for each ring, the SEL inputs of each multiplexer associated with the cell of index 0 are asserted every N+2K+2*(I mod K) clock cycles.

Each cell performs a computation which, for the purposes of illustration, may be decomposed into the following sequence of bit-wise operations. The multiplicand input bit is ANDed with the multiplier input bit. Similarly, the modular correction input bit is ANDed with the modular selection input bit. The outputs of the two aforementioned computations are added with the partial sum input and the two carry inputs. The least significant bit of the latter sum is connected to the cell's partial sum output, while the two bits generated in the most significant position are connected to the two carry outputs. The multiplicand, modular correction, multiplier, and modular selection inputs are also passed to the multiplicand, modular correction, multiplier, and modular selection outputs, respectively.

Initial data is supplied externally to the unit such that K new independent data sets commence processing in sequence every N+2K−1 clock cycles. Multiplicand and modular correction data bits are entered into the cells of the topmost ring in the following manner. The cell of index 0 receives the least significant modular correction, multiplicand and multiplier bits associated with the first of the K data streams upon the first clock cycle wherein PASS_DATA is asserted. Upon the next clock cycle, the least significant modular correction, multiplicand and multiplier bits associated with the second of K currently entering data streams are received. In each of the subsequent K−2 cycles, the index 0 cell successively receives the remaining K−2 least significant bits of each input type. An identical process commences for the next-to-least significant modular correction and multiplicand inputs in the cell of index 1 in the second clock cycle after PASS_DATA is asserted. Similarly, the delivery of the first of K bits corresponding to significance J is provided J cycles after the initial assertion of PASS_DATA in the cell of index J mod K. After K clock cycles, the bit position 2 of the multiplier input data begins to arrive and is received for the remaining data streams for the next K cycles. This process continues for subsequent clock cycles.

An illustration of the modular multiplier array for the K=8, N=2 case is shown in FIG. 1. Arrays for other parameterizations should be evident to an individual in the field with a grasp of the above description.

What is claimed is:

1. A machine for processing digital data which performs modular multiplication, comprising:
   (a) input lines, transferring a plurality of data comprising:
      (1) modular correction words of size N bits, and
      (2) multiplicand data words of size N+1 bits, and
      (3) multiplier data words of size N+1 bits, and
   (b) output lines which transfer modular product words of size N+1 bits, and
   (c) N rows of processing cells each comprising:
      (1) delay elements which transfer an input bit presented during the current clock cycle to the output after a specified number of clock cycles, and
      (2) multiplexers which transfer the primary input to the output when the select input is de-asserted, and transfer the secondary input to the output when the select input is asserted, and
      (3) N rings of K cells each, row-indexed in ascending order, I=0 to N−1, from top to bottom, each comprising:
         (a) K−1 lesser significant cells, column-indexed in ascending order, J=0 to K−2, in a counter-clockwise manner about the ring beginning at the least significant cell, which:

(1) compute the binary sum of the multiplicand input bit Boolean ANDed with the multiplier input bit, the modular correction input bit Boolean ANDed with the modular selection input bit, the partial sum input bit, and the two carry input bits, and (2) transfer the least significant bit of the said binary sum to the partial sum output bit, and (3) transfer the two most significant bits of the said binary sum to the two carry output bits, and (4) transfer the said multiplicand input, said multiplier input, said modular correction input, and said modular selection input bits to the multiplicand output, multiplier output, modular correction output, and modular selection output bits, respectively, and (5) are connected such that the said multiplicand output is transferred to the input of a said delay element having delay equal to three clock cycles, whose output is connected to the multiplicand input of the cell having column index (J+1 mod K) in the below-adjacent ring, and (6) are connected such that the said modular correction output is transferred to input of a said delay element having delay equal to three clock cycles, whose output is connected to the modular correction input of the cell having column index (J+1 mod K) within the below-adjacent ring, and (7) are connected such that the said modular selection output is transferred to input of a said delay element having delay equal to one clock cycle, whose output is connected to the modular selection input of the cell having column index (J+1 mod K) within the same ring, and (8) are connected such that the said multiplier output is transferred to input of a said delay element having delay equal to one clock cycle, whose output is connected to the multiplier input of the cell having column index (J+1 mod K) within the same ring, and (9) are connected such that the said two carry outputs are each transferred to a said delay element having delay equal to one clock cycle, whose outputs are connected to the respective carry input of the cell having column index (J+1 mod K) within the same ring, and

(10) are connected such that the said partial sum output is transferred to the input of a said delay element having delay equal to two clock cycles, whose output is connected to the said partial sum input of the cell having column index J within the below-adjacent ring, and (b) one most significant cell, having column index K−1, which:

(1) computes the binary sum of the multiplicand input bit Boolean ANDed with the multiplier input bit, the modular correction input bit Boolean ANDed with the modular selection input bit, the partial sum input bit, and the two carry input bits, and (2) transfer the least significant bit of the said binary sum to the partial sum output bit, and (3) transfer the two most significant bits of the said binary sum to the two carry output bits, and (4) transfer the said multiplicand input, said multiplier input, said modular correction input, and said modular selection input bits to the multiplicand output, multiplier output, modular correction output, and modular selection output bits, respectively, and (5) are connected such that the said multiplicand output is transferred to the input of a said delay element having delay equal to three clock cycles, whose output is connected to the multiplicand input of the cell having column index 0 in the below-adjacent ring, and (6) are connected such that the said modular correction output is transferred to input of a said delay element having delay equal to three clock cycles, whose output is connected to the modular correction input of the cell having column index 0 within the below-adjacent ring, and (7) are connected such that the said modular selection output is transferred to the input of a said delay element having delay equal to one clock cycle, whose output is connected to the primary input of a said multiplexer, whose output is connected to the modular selection input of the least significant cell, corresponding to column index 0, within the same ring, and (8) are connected such that the said multiplier output is transferred to input of a said delay element having delay equal to one clock cycle, whose output is connected to the primary input of a said multiplexer, whose output is connected to the multiplier input of the cell having column index 0 within the same ring, and (9) are connected such that the said two carry outputs are each transferred to a said delay element having delay equal to one clock cycle, whose outputs are connected to the respective carry input of the cell having column index 0 within the same ring, and

(10) are connected such that the said partial sum output is transferred to the input of a said delay element having delay equal to two clock cycles, whose output is connected to the said partial sum input of the cell having column index J within the below-adjacent ring, and is connected to a said delay element having a delay equal to three clock cycles, whose output is connected to the secondary input of a said multiplexer, whose output is connected to the modular correction input of the least significant cell (having column index 0) in the below-adjacent ring, and (d) A delay line comprising:

(1) an initial delay element having a delay equal to two clock cycles, whose input is identically the input of the delay line and whose output is connected to the input of a second delay element and is additionally connected to the select inputs of the said multiplexers associated with the modular selection and multiplier inputs of the said least significant cells of rings having index I satisfying the relationship I mod K=1, and (2) a sequence of K−2 delay elements each having delay equal to two clock cycles and rank 2 through K−1, which are connected such that the input of the delay element having rank P is connected to the output of the delay element having rank P−1, and the output of the delay element of rank P is connected to the input of the delay element of rank P+1 and is additionally connected to the select inputs of the said multiplexers associated with the modular selection and multiplier inputs of the said least significant cells associated with rings having index I satisfying the relationship I mod K=P, and (e) A counter which generates an asserted output signal every N+2K clock cycles and is otherwise de-asserted, wherein said output is connected to the input of said delay line and is additionally connected to the select inputs of said multiplexers associated with the multiplier input of the least significant cells associated with rings having index I satisfying the relationship I mod K=P.

* * * * *